United States Patent
Anderson

(10) Patent No.: US 10,989,563 B2
(45) Date of Patent: Apr. 27, 2021

(54) AUTOMATIC CALIBRATION OF RATE GYROSCOPE SENSITIVITY

(71) Applicant: CloudNav Inc., San Jose, CA (US)

(72) Inventor: Erik Anderson, San Francisco, CA (US)

(73) Assignee: CLOUDNAV INC., San Jose, CA (US)

( * ) Notice: Subject to any disclaimer, the term of this patent is extended or adjusted under 35 U.S.C. 154(b) by 0 days.

(21) Appl. No.: 16/452,351

(22) Filed: Jun. 25, 2019

(65) Prior Publication Data
US 2019/0390976 A1    Dec. 26, 2019

Related U.S. Application Data
(60) Provisional application No. 62/689,561, filed on Jun. 25, 2018.

(51) Int. Cl.
| | | |
|---|---|---|
| G01C 25/00 | (2006.01) | |
| G01C 19/5776 | (2012.01) | |
| G06F 3/01 | (2006.01) | |
| G01C 21/20 | (2006.01) | |
| G01P 15/14 | (2013.01) | |

(52) U.S. Cl.
CPC ....... *G01C 25/005* (2013.01); *G01C 19/5776* (2013.01); *G01C 21/20* (2013.01); *G01P 15/14* (2013.01); *G06F 3/012* (2013.01)

(58) Field of Classification Search
CPC ..... G06F 3/013; G06F 3/012; G01C 19/5776; G01C 25/005; G01C 21/20; G01P 15/14
See application file for complete search history.

(56) References Cited

U.S. PATENT DOCUMENTS

| | | | |
|---|---|---|---|
| 2005/0174324 A1 | 8/2005 | Liberty et al. | |
| 2013/0120147 A1 | 5/2013 | Narasimhan et al. | |
| 2013/0265225 A1* | 10/2013 | Nasiri | A63F 13/92 345/156 |
| 2014/0278191 A1 | 9/2014 | Anderson | |
| 2017/0052751 A1* | 2/2017 | Aurongzeb | G06F 3/1446 |
| 2018/0143757 A1* | 5/2018 | Champion | H04N 1/00962 |

* cited by examiner

*Primary Examiner* — Abbas I Abdulselam
(74) *Attorney, Agent, or Firm* — Perkins Coie LLP

(57) ABSTRACT

Devices, systems and methods for automatic calibration of rate gyroscope sensitivity are described. One exemplary method includes receiving a first plurality of measurements from a gyroscope and a second plurality of measurements from at least another sensor including at least one accelerometer, generating an orientation estimate of the device and a plurality of orientation corrections based on the first and second plurality of measurements, generating an estimate of a sensitivity of the gyroscope based on the orientation estimate, the plurality of orientation corrections and the first plurality of measurements, and calibrating at least the gyroscope based on the estimate of the sensitivity. In an example, the at least another sensor may include an accelerometer and/or a magnetometer.

17 Claims, 9 Drawing Sheets

AUTOMATIC CALIBRATION OF RATE GYROSCOPE SENSITIVITY

CROSS-REFERENCE TO RELATED APPLICATION

This patent document claims priority to and benefits of U.S. Provisional Patent Application No. 62/689,561 entitled "AUTOMATIC CALIBRATION OF RATE GYROSCOPE SENSITIVITY" and filed on Jun. 25, 2018. The entire content of the before-mentioned patent application is incorporated by reference as part of the disclosure of this patent document.

TECHNICAL FIELD

This document generally relates to gyroscopes, and more particularly to improving calibration of gyroscopes.

BACKGROUND

A gyroscope is a device used for measuring or maintaining orientation and angular velocity. In an example, a gyroscope includes a spinning wheel or disc in which the axis of rotation is free to assume any orientation by itself. The orientation of this axis is unaffected by tilting or rotation of the mounting when the gyroscope is operating. A rate gyroscope is a type of gyroscope that indicates a rate of change of an angle as a function of time (as compared to a traditional gyroscope that indicates direction).

Rate gyroscope sensitivity is typically measured by performing a rotation of known arc length about a known geometric axis, and is represented as the ratio of the measured rotation to the known true rotation, which is a dimensionless quantity with nominal value of 1.

SUMMARY

Embodiments of the disclosed technology relate to the automatic calibration of a rate gyroscope, thereby ensuring that any application that uses the gyroscope is minimally impacted over the life of the rate gyro.

The present document provides methods, systems and devices for the automatic calibration of a rate gyroscope. An exemplary method for automatic calibration in a device includes receiving a first plurality of measurements from a gyroscope and a second plurality of measurements from at least another sensor including at least one accelerometer; generating an orientation estimate of the device and a plurality of orientation corrections based on the first and second plurality of measurements; generating an estimate of a sensitivity of the gyroscope based on the orientation estimate, the plurality of orientation corrections and the first plurality of measurements; and calibrating at least the gyroscope based on the estimate of the sensitivity.

DETAILED DESCRIPTION

Figure 1:
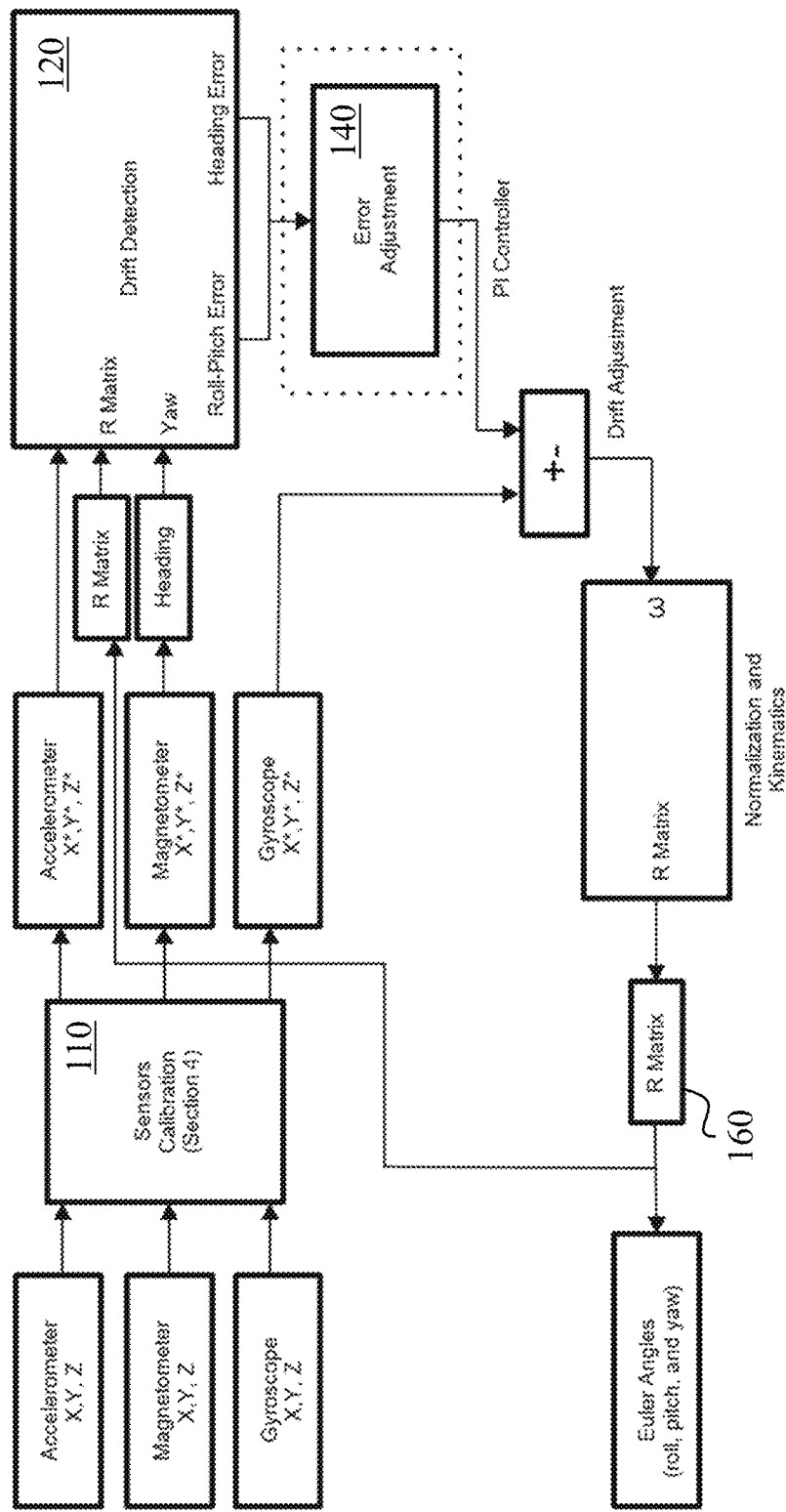
FIG. 1 illustrates an example block diagram for sensor fusion.

As noted earlier, the sensitivity of a rate gyroscope is typically measured by performing a rotation of known arc length about a known geometric axis. The measured rotation from the rate gyro is the reported angular velocity integrated over time. Rate gyro sensitivity calculated using this conventional method is the ratio of the measured rotation to the known true rotation, which is a dimensionless quantity with nominal value of 1. Any calibration to determine this sensitivity, if performed at all, is typically done at the factory and not by the end user. Furthermore, the value is susceptible to change due to change in temperature, aging, and changes in mechanical stress, so that the initial factory calibration quality is likely to degrade over the life of the rate gyro.

Typical consumer grade MEMS rate gyros are specified to have typical sensitivity of around 1±0.03 (3% sensitivity error). With a typical sensitivity error of 3%, a complete rotation of 360 degrees results in an integrated angle error of just over 10 degrees, increasing without bound if additional rotations occur in the same direction. This may significantly impact the use of rate gyroscopes in many applications.

In the sections that follow, devices, systems and methods for automatic calibration of the sensitivity of a rate gyroscope are described. For brevity, a rate gyroscope will be alternatively referred to as a "gyroscope" or "gyro" in the reminder of this document. Section headings are used in the present document to improve readability of the description and do not in any way limit the discussion or the embodiments (and/or implementations) to the respective sections only.

Exemplary Embodiments of Automatic Rate Gyroscope Sensitivity Calibration

Embodiments of the disclosed technology include calibration methods (and/or techniques) that are able to leverage sensor fusion methods for accelerometers, magnetometers and gyroscopes (referred to as A, M and G, respectively). Some implementations of A/G/M sensor fusion include, but are not limited to, the following capabilities:

(1) Combine accelerometer, gyroscope and magnetometer data to estimate device orientation, which is typically expressed as a quaternion (which is based on a number system that extends the complex numbers and incorporates particular mathematical rules), or as an orientation axis and corresponding amount of rotation about that axis, or as a set of Euler angles, or using a different coordinate system/framework;

(2) Calibrate magnetometer bias and sensitivity; and (3) Calibrate gyro bias when the device is very still.

Algorithms that provide these capabilities vary among implementations, and may use a Kalman filtering approach in some cases. For implementations that combine all three sensors, such as the one shown in FIG. 1, the accelerometer provides an absolute reference for tilt and the magnetometer provides an absolute reference for heading. Since rate gyros output only the rate of change of orientation, they are not typically used in isolation to maintain an accurate estimate or orientation.

FIG. 1 shows an example of sensor fusion that uses a direct cosine matrix (DCM) algorithm, which calculates the orientation of a rigid body, in respect to the rotation of the earth by using rotation matrices. The three sensors used in this algorithm are:

The accelerometer measures the earth's gravity (minus acceleration),

The magnetometer measures the earth's magnetic field, and

The gyroscope sensor measures angular velocity.

The gyroscope sensor is the primary sensor used to calculate the orientation of the system. Since the gyroscope is not affected by the gravitational or magnetic field, it requires the readings from the accelerometer and magnetometer to calculate a reference vector. Gyroscopes' readings have different offsets depending on which direction the gyroscope is facing; when these readings are integrated over time it causes the integral result to drift. The accelerometer is not affected by drift, therefore, it can be used as an orientation reference in the X and Z axis of the rigid body to compensate the roll-pitch error (gyro's offset error). The magnetometer's readings are used to calculate the heading of the rigid body. The magnetometer must be three axes to be able to calculate the heading of the system in any position of the sensor platform; to compensate yaw error. The heading of the system used as the reference vector in the Y axis (yaw error), in addition to the roll-pitch error calculated by the accelerometer, it allows the system to calculate the rotation correction matrix. Afterwards, the algorithm uses a proportional plus integral (PI) feedback controller on the correction matrix to the remove the drift from the gyro's readings.

The compensated gyroscope readings denoted as co (omega), are then fed to the "Normalization & Kinematics" block as shown in FIG. 1. The rotation matrix's columns are unit vectors, and thus, before calculating the kinematics portion it must be normalized. Once normalized, the gyroscope along with the previous rotation matrix are used to calculate the current rotation matrix (R Matrix), and finally, the Euler angles are calculated from the updated rotation matrix.

In some embodiments, a 9-axis sensor fusion algorithm may include at least the following operations:

(1) Start with a previous estimate of the device orientation in world (or global) coordinates (e.g., coordinates of the initial or primary coordinate system being used);

(2) Forward project the orientation estimate for each sample based on the latest gyroscope measurement; and (3) Apply corrective feedback to the orientation using accelerometer and magnetometer measurement.

Regardless of the underlying mathematical implementation, 9-axis sensor fusion implementations typically use the accelerometer-derived gravity reference and the magnetometer-derived heading reference to make corrections to the orientation estimate. In some embodiments, corrections to orientation can be expressed as rotations.

In some embodiments, changes in device orientation as calculated by the sensor fusion algorithm may be observed, and subsequently combined with knowledge of the correction rotations applied by sensor fusion to converge upon an estimate of gyroscope sensitivity calibration values. Using these inputs from basic sensor fusion, the gyro sensitivity calibration estimator adjusts the sensitivity parameters to minimize a figure of merit, e.g., the amount of orientation correction required as a fraction of total rotation.

In some embodiments, and as shown in FIG. 1, the drift detection module 120 applies the correction rotation axes, which are represented as roll-pitch error (using accelerometer as a reference) and heading error (using magnetometer as a reference). The error adjustment module 140 calculates the amount of rotation to be applied about the correction axes, and the rotation matrix (also referred to as the R-Matrix) module 160 generates a sample-by-sample estimate of the device orientation.

Figure 2:
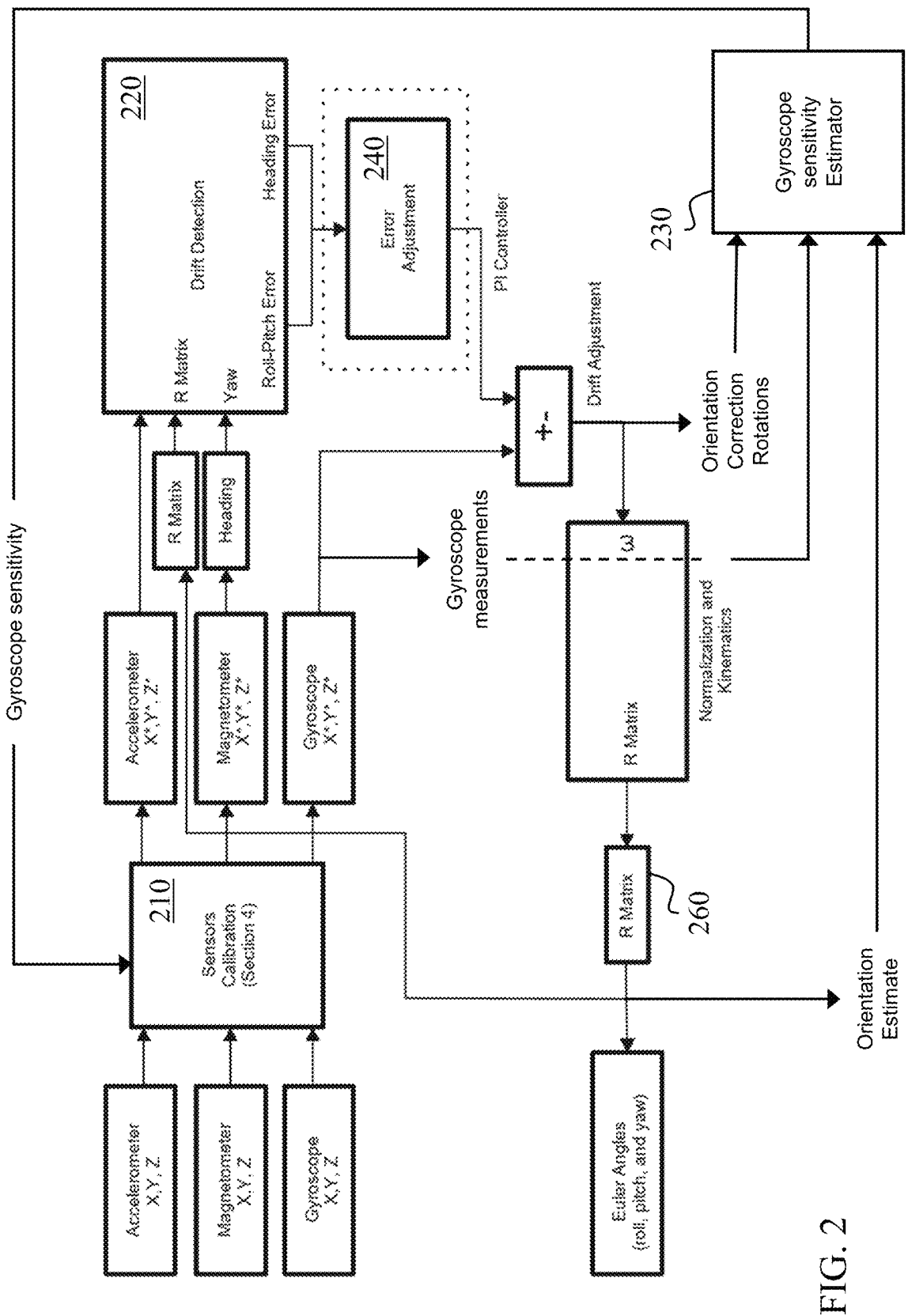
FIG. 2 illustrates an example implementation of automatic calibration of rate gyroscope sensitivity based on sensor fusion, in accordance with the disclosed technology.

FIG. 2 shows an example implementation of automatic calibration of rate gyroscope sensitivity based on sensor fusion. This example includes some features and/or components that are similar to those shown in FIG. 1, and described above. At least some of these features and/or components may not be separately described in this section.

In some embodiments, when the accelerometer and the magnetometer are correctly calibrated, then gyro bias and sensitivity may be estimated opportunistically. No specific behavior is required of the user, and the system calibrates through passive observations only. If there are errors in accelerometer and magnetometer calibration, gyro sensitivity and bias can still be calculated, but convergence to correct sensitivity will take longer and the errors in the resulting sensitivity calibration will be larger.

If gyro measurements are propagated forward with perfect bias and sensitivity estimates, the amount of orientation feedback required will be minimized, and the dominant remaining error source will be gyroscope measurement noise.

In some embodiments, and as shown in FIG. 2, the inputs to the gyro sensitivity estimator 230 are (1) a current sample estimate of orientation, (2) the set of correction rotations applied by fusion since the last report, and (3) gyroscope measurements. In an example, the samples estimate of the orientation may be specified using a quaternion, rotation matrix, rotation vector or other equivalent formulation. In an example, the set of correction rotations are for two correction axes, (i) the z world axis for yaw (heading) correction, and (ii) a second axis to correct the estimated tilt. In another example, the rotation corrections from sensor fusion are expressed as a rotation axis and an angle of rotation about the axis. In an example, the gyroscope measurements are typically x, y, and z-axis rate of rotation for the current data sample.

Figure 3:
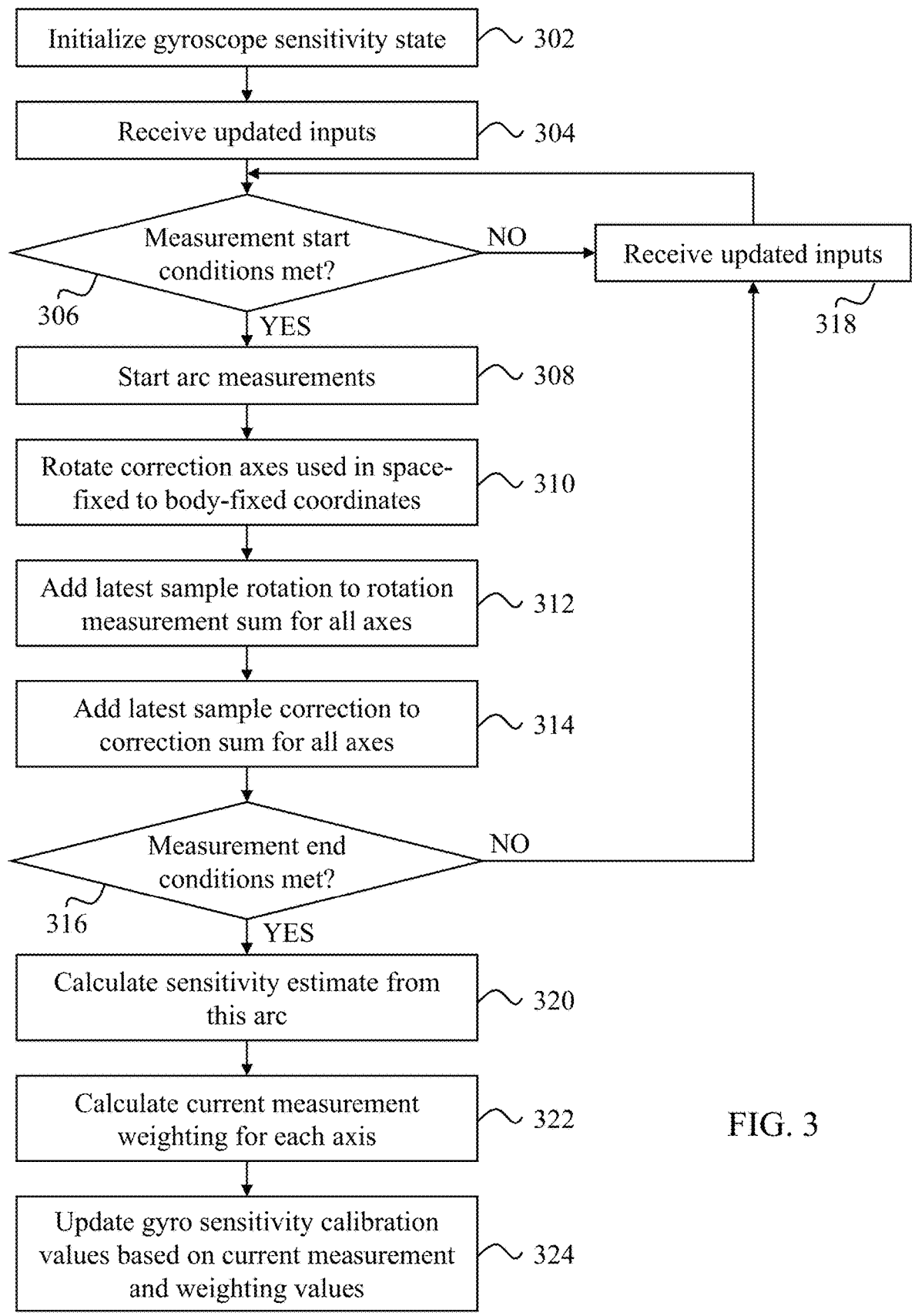
FIG. 3 is a flowchart that illustrates an example method for updating the gyroscope sensitivity measurement, in accordance with the disclosed technology.

In some embodiments, the sensor fusion and gyroscope measurements may be used to construct a series of sensitivity measurements. FIG. 3 shows a flowchart of an example method for constructing and updating the gyroscope sensitivity measurement, and some operations are indicated in the description below. Each sensitivity measurement is weighted, then applied to the overall sensitivity estimate.

Making an Example Sensitivity Measurement: In some embodiments, and in the most general case, a device containing a gyroscope being held or worn by a user will encounter a broad range of rotations, angular velocity vectors, and angular acceleration vectors. However, when rotations are started and ended in a short period of time (partial or full range of motion of a particular joint in the body), the movement can often be well approximated by a pure rotation about a constant axis, with angular acceleration vector parallel to the angular velocity axis. In these scenarios, the ground truth for the actual rotation is not known (e.g., as it would be in a controlled factory setting), but the rotational corrections applied by sensor fusion during the short time of the sensitivity measurement are available. The corrections include the dynamic errors in sensor fusion, but the corrections are correlated with the gyroscope sensitivity errors.

In some embodiments, the start and end of a sensitivity measurement may be defined to approximate a short pure rotation. Then, an estimate of the gyroscope sensitivity error may be constructed by summing the correction angles applied by sensor fusion during the arc, and dividing by the total length of the arc. Although, the result may be a bit noisy, it is still a useful (at least partially correlated) estimate of sensitivity about an axis of rotation. The rotation axis may be projected onto the body coordinate axes of the gyroscope, and a correction applied to each axis that is intended to drive the numerator (total rotation corrections applied by sensor fusion) toward zero. Since the measurement is noisy, the correction factors may be weighted based on the estimate of the quality of the measurement. In an example, applying the weighting advantageously enables much faster convergence and better error statistics (e.g., sensitivity error standard deviation, expected value of absolute value of mean error).

Start and End of an Example Gyro Sensitivity Estimate: Some types of motion will produce more reliable sensitivity measurements than others, and higher weights are applied to such motions (e.g., a substantial rotation around a single axis in a short period of time). With more rotation in the measurement, the correction needed due to sensitivity error stands out relative to sensor measurement noise, errors in sensor fusion orientation estimate, and errors in gyro bias. Gyro bias errors, in particular, continue to accrue in proportion to the measurement time, so if a clean rotation were completed quickly, the error in the gyro sensitivity measurement from the gyro bias errors would be minimized.

In some embodiments, and to account for the fact that all the sensor measurements have some noise on them, a minimum threshold for angular rotation rate is set. In an example, a gyroscope sensitivity state is initialized (operation 302 in FIG. 3), updated inputs are received (operation 304 in FIG. 3), and a measurement is started only when at least one axis crosses the minimum angular rotation rate threshold (operation 306 in FIG. 3). In another example, the norm of the angular velocity may be required to exceed a threshold. However, the individual axis comparisons are computationally cheaper as compared to the norm of the angular velocity.

Once the measurement has started (operation 308 in FIG. 3), and till the measurement stop conditions are met, both the individual sample rotation angles and the correction angles applied by sensor fusion are summed together. The rotations and corrections are first rotated to gyroscope body coordinates (operation 310 in FIG. 3), then summed (operations 312, 314 in FIG. 3). To keep the measurement going, at least one of the gyroscope axes are required to report the absolute value of angular velocity above a threshold. When this condition no longer holds true, the measurement is stopped (operation 316 in FIG. 3).

Example of Calculating the Measurement Weight (Operation 322 in FIG. 3): In some embodiments, a maximum weighting that can be applied to a single sensitivity measurement is selected. Since the measurements have significant noise and (sensor noise aside) are only partially correlated with the true sensitivity, the fastest sensitivity estimate convergence time to span many measurements may be desired. The noisier and less correlated the measurements, the slower the convergence should be. In an example, the maximum weighting for a good measurement may be set to 0.05.

In some embodiments, and in addition to setting a global maximum weighting value, a relative weighting to each measurement that favors measurements with more rotation over measurements that include less rotation may be applied. In some embodiments, measurements that exceed a threshold rotation (e.g., 7C radians) are set to the maximum relative weighting of 1, which when multiplied by the maximum absolute weighting of 0.05 produce an overall weighting of 0.05. Measurements including less than a minimum rotation (e.g., 0.1 radians) are set to a weighting of 0. More generally, different floor and ceiling values may be used. In some embodiments, the relative gains applied increase linearly with the amount of rotation included in the measurement minus the minimum rotation threshold, up to a relative value of 1. In other words, the relative weight applied to the measurement is $$(\min(\omega \cdot \omega_{max}) - \omega_{min})/(\omega_{max} - \omega_{min}).$$

Here, $\omega$ is the observed rotation, and $\omega_{min}$ and $\omega_{max}$ are the minimum and maximum rotation thresholds, respectively. Furthermore, the absolute weight applied is a product of the maximum weight ($\omega_{max}$) and the relative weight ($\omega_r$).

Example of Updating the Gyro Sensitivity Estimate (Operation 324 in FIG. 3): The gyro sensitivity estimate ($k_{gyro}$) may be updated based on the individual sensitivity measurement and the associated measurement weight, as follows:

$$k_{gyro,i+1} = k_{gyro,i}(1 w_{max} w_r \Delta_k).$$

Here, the subscript (i+1) and i represents the sample index, and $\Delta_k$ is the single measurement delta sensitivity, which may be computed for the gyroscope x-axis as:

$$\Delta_k = \Sigma |c \cdot W_x| / \Sigma |r \cdot W_x|$$

Here, · denotes the dot product, c is the correction rotation vector applied each sample included in the measurement $W_x$ and r is the observed rotation vector during each sample included in the measurement period.

Related Embodiments for Automatic Rate Gyroscope Sensitivity Calibration

Implementations of the presently disclosed technology can be applied to specific situations that are advantageously enhanced and/or improved by the use of automatic rate gyroscope sensitivity calibration. In some embodiments, the convergence rates and uncertainty updates may be bounded using the sensor noise floors for all the sensors in the applications described in this portion of the present document.

Embodiments for Continuous Motion: In some embodiments, the gyro sensitivity estimation methods described above may be used to calculate gyro bias during continuous motion. For periods of low motion, the approximate bias method described above may be applied. Furthermore, the approximate bias method may be used as a boundary value. For active cases like running, e.g., the system is turned on while the user is already in motion, the same inputs shown in the context of FIG. 2 (orientation estimate, correction rotations, and gyro measurements) may be used.

In some embodiments, the convergences of the gyro sensitivity and gyro bias estimate variables may be dependent. An accurate estimate of either variable may be obtained after the other variable has converged. In practical situations, when the estimate of both the gyro sensitivity and gyro bias estimate are somewhat close, the framework may be adjusted so as to allow both the variables to converge together.

In some embodiments, the same measurements data along with start and end conditions already calculated may be used for sensitivity calculations. If sensitivity is well calibrated, then the remaining gyro errors to be corrected are due to the gyro bias. Although the corrections may never be zero, since there will always be sources of error in the system (e.g., the orientation estimate noise when movement cannot be tracked perfectly), the set of calibrations that globally minimizes the required corrections is the correct set of gyro calibration values.

In some embodiments, once correction errors from sensitivity have been mostly removed, it may be assumed that most of the remaining error is from gyro bias errors. As in the gyro sensitivity case, the correction rotations may be projected onto the body coordinate axes of the gyroscope. In the common measurement case, the same correction axis projections may be used for both sensitivity and bias.

In some embodiments, the delta bias measurement itself is different than for the sensitivity case. For example, the sensitivity calibration value is multiplicative, whereas the bias case is additive. for gyro bias case, the sign of the correction values projected onto each axis may be retained, whereas in the sensitivity case, the absolute values may be summed. For the case where sensitivity is perfectly modeled, and the orientation is correct, the single measurement delta bias measurement is computed as $\Sigma |c \cdot W_x|/T_{measurement}$.

In some embodiments, and as in the gyro sensitivity case, the measurements that are of high quality (e.g., more trustworthy) may be preferentially weighted. For example, in the sensitivity case, measurements with more rotation in a short period are preferred. For example, in the bias case, the preference is for less rotation and longer time, as that will minimize the other error contributors including orientation errors and errors in gyro sensitivity calibration. In an example, the same maximum absolute gain as for sensitivity, 0.05, may be used. The relative gain is computed as $g=g_1 \times g_2$.

Here, $g_1=(\min((T_{meas}-T_{meas,min})T_{meas,max}))/T_{meas,max}$, which corresponds to more trust for longer measurement times.

Here, $g_2=\min(T_{low}\omega_{r,max})/\max(T_{low}\omega_{r,max})$, where $T_{low}$ is the threshold for low active movement and $\omega_{r,max}=\Sigma |r \cdot W|$, which was previously calculated in the sensitivity estimator case.

The update to the gyro sensitivity estimate for each axis is given as:

$$b_{gyro} + = G_{max} \times g \times \Delta_{bias}.$$

Here, $b_{gyro}$ is the gyroscope bias, $G_{max}$ is the maximum gain and $\Delta_{bias}$ is the delta bias measurement.

Embodiments for Periodic Motion: Gyro bias is normally estimated while a device is held very still. This is typically done by averaging the reported gyro values when the known rotation rate is 0 to reduce the effect of sensor noise and produce the correct bias. However, the method is susceptible to error if the system begins its observations while motion has already begun (e.g., a runner switches on his system after he starts running). In this scenario, if the gyro output data for each axis is averaged or filtered, large and variable errors may result. However, if each of the errors were controlled and removed, a much more accurate and repeatable estimate of gyro bias in a vigorously moving system may be made.

In some embodiments, the errors that need to be adjusted for include:
(1) incorrect gyro sensitivity;
(2) path-dependent observed rotation on each axis; and
(3) uncertainty between initial and final orientations of the device during the observation period.

In an example, error (2) may be the dominant source of error if gyro sensitivity estimates are not correct. In another example, error (3) may occur if the path of the runner, cyclist, drone, other was not a straight line during the observation period, and would manifest as an error in the bias estimate. However, in the case of periodic motion such as running, the bias error will be smaller if the same repeatable feature of the periodic motion is used to mark the initial and final orientations in the measurement period.

Path-Dependent Observed Rotation on Each Axis:

During a periodic motion, it is assumed that a set of motions that lead to identical orientations each period can be repeated exactly. If the time integration of each gyroscope device axis during 1 period is considered, a non-zero value (positive or negative) on each axis is observed. For example, for 4 successive rotations: (i) rotate 90 degrees about negative y-axis world, (ii) rotate 90 degrees about the positive world z axis, (iii) rotate 90 degrees about the negative world x axis, (iv) rotate 90 degrees about the negative world z-axis. After these rotations, the same starting orientation will be achieved, but the sum of observed rotations on the device axes would be: x-axis: +90 degrees, y-axis: −90 degrees, and z-axis: 0 degrees.

In other words, if there is an uncorrected error in sensitivity, the net rotations (non-path independent) will appear as an error in the rotation used for the bias calculation equal to the net rotation on the axis multiplied by the uncorrected sensitivity error. For example, a 3% error in gyro sensitivity on each axis and repeating the aforementioned 4-rotation series once per second would result in an error of +2.7°/sec on the x-axis, −2.7°/sec on the y-axis, and 0° on z. In many applications, this error is too inaccurate to be very useful.

In some embodiments, this problem may be addressed by accurately calibrating the gyro sensitivity. If the gyro sensitivity calibration is accurate, then the errors due to non-path independence disappear. In other embodiments, another approach may determine that the periodic motion is very close to path independent. For example, observations of sensors worn on the wrist or arm are typically very path dependent, while sensors worn in a glasses form factor are much closer to path independent.

In some embodiments, path independent motion may be detected by noticing that the heading drift rate while running on a straight path at different step frequencies is the same. There may be a common contribution from bias, but also a frequency dependent heading drift component from the path dependent sensitivity errors. If the sum of these errors is the same at different frequencies, then the path dependent error must be zero, and therefore the periodic motion must be path independent. In other embodiments, information about the sensor pack orientation may be leveraged. For example, it may be known that the sensor pack is mounted on glasses, which enables verification of the path independence assumption for the bias estimates.

Uncertainty Between Initial and Final Orientations:

This source of error may be addressed by (1) taking the measurements aligned with the same feature of the periodic motion (e.g., looking for zero crossings in the periodic rotations), and (2) either ensuring that the movement, during the measurement, is in a straight line or knowing the difference in heading between the beginning and the end of the measurement.

In some embodiments, ensuring that the movement is in a straight line is facilitated by using the average magnetometer generated heading over each period of the motion to determine that our path is sufficiently straight. In other embodiments, a GPS or other GNSS system (e.g., GLONASS, BeiDou, Galileo) may be used to verify that the path is sufficiently straight, but this approach is typically valid only when moving significantly faster than a running pace. Furthermore, location data from the GPS and GNSS systems may be susceptible to filtering and/or lag.

In yet other embodiments, the delta sum of magnitude of position differences over an observation period may be compared with the magnitude of position delta using just the initial and final measurements of the observation period. For example, if the user is turning then the delta sum will be significantly greater since the beginning to ending single measurement will be along the chord instead of around the arc. For example, if the position is jumping around from sample to sample, the delta sum will also be significantly larger than the beginning to ending position change. For example, if the ratio of the delta_sum to the difference between the beginning and ending positions over an observation window (e.g., 30 seconds) is very close to 1, then the probability that the movement is not in a straight line is low, and straight line motion may be concluded and/or ensured.

In some embodiments, and after eliminating the error due to path dependent rotation, a much-improved bias measurement may be obtained by simple averaging (or other filtering) from a first observation of a periodic feature A during the observation window to a last observation of the periodic feature A during the observation window. Although there may be some uncertainty in the beginning and ending orientations (assuming the motions are not exactly repeated each cycle), the error may be on the order of 10°. In an example, with 40 seconds of straight line travel, the resulting gyro bias error is around 0.25°/s, which is quite useful for navigation in the event of magnetic anomaly (for an A/G/M system), or for short periods of GPS outage. For example, if the GPS signal is lost for 20 seconds while running under a freeway, the heading accuracy is maintained within 5° even though a magnetometer may be absent or operating unreliably, the gyro was badly calibrated when the system was turned on, and the system has been in constant motion with no periods of low motion to better estimate gyro bias.

Embodiments for Erroneous Calibration or Single Sensor Operation: As discussed above, mostly periodic motions (e.g., running) will have gyro errors that include path-dependent sensitivity errors and path independent bias errors on each axis. In the event that calibration (as described above) cannot be performed, and there is a GPS outage, the heading may be accurately determined and navigation may continue if the motion is on a stable platform or mostly periodic, and it is detected that travel is in a straight line. For example:

During a period of straight travel and constant step rate, a roughly constant rate of heading drift from one cycle of the periodic motion to the next may be observed. For example, during a 30 second straight run at constant step rate, the drift rate should be very close to a straight line. Tracking this drift rate may advantageously enable accurate heading determination and continued navigation.

As long as the user is running in the same manner and at the same step rate, the heading in the event of a GPS outage may be approximate as last trusted_heading+gyro_delta_heading_since_outage_start−observed-_heading_gyro_drift_rate*(T−Toutage_start). If the step rate changes significantly, some accuracy might be lost but this approximation is more reliable than using the uncalibrated gyro values.

Embodiments for Activity Detection: During a GPS outage, a user's location may be determined using a pedometer. However, if the user runs in place, the pedometer may correctly detect running, but the user's position may jump around even though the user is not moving in the world x-y plane. As discussed above, some of the path-dependent motion is due to specific movements of the legs and hips, which are different when running forward vs running in place.

Identifying the path-dependent motion using embodiments of the presently disclosed technology advantageously enables differentiating between different activities, e.g., running along a course and running in place. Some of the features that may be identified include:

(1) significantly reduced acceleration in the x-y world plane;

(2) the ratio, R=integrated_rotation_sum/sum_of_abs_rotations for each axis of the gyroscope is significantly different for running in place compared to running forward; and (3) intensity reduction and step frequency reduction for running in place as compared to regular forward running.

Example Applications for Automatic Rate Gyroscope Sensitivity Calibration

Virtual Reality Goggles for Head Tracking:

In an example application, implementations of the disclosed technology are used in virtual reality (VR) goggles (e.g., for head tracking or augmented reality (AR) applications) to advantageously enable the image seen by the user of the VR goggles to remain stable. VR goggles may be susceptible to path dependent rotations (e.g., rotations return to original location, but one or more gyro axes experience a non-zero net rotation) that may result in a different orientation than what was originally started with (if the gyro sensitivity is not well calibrated).

Figure 4:
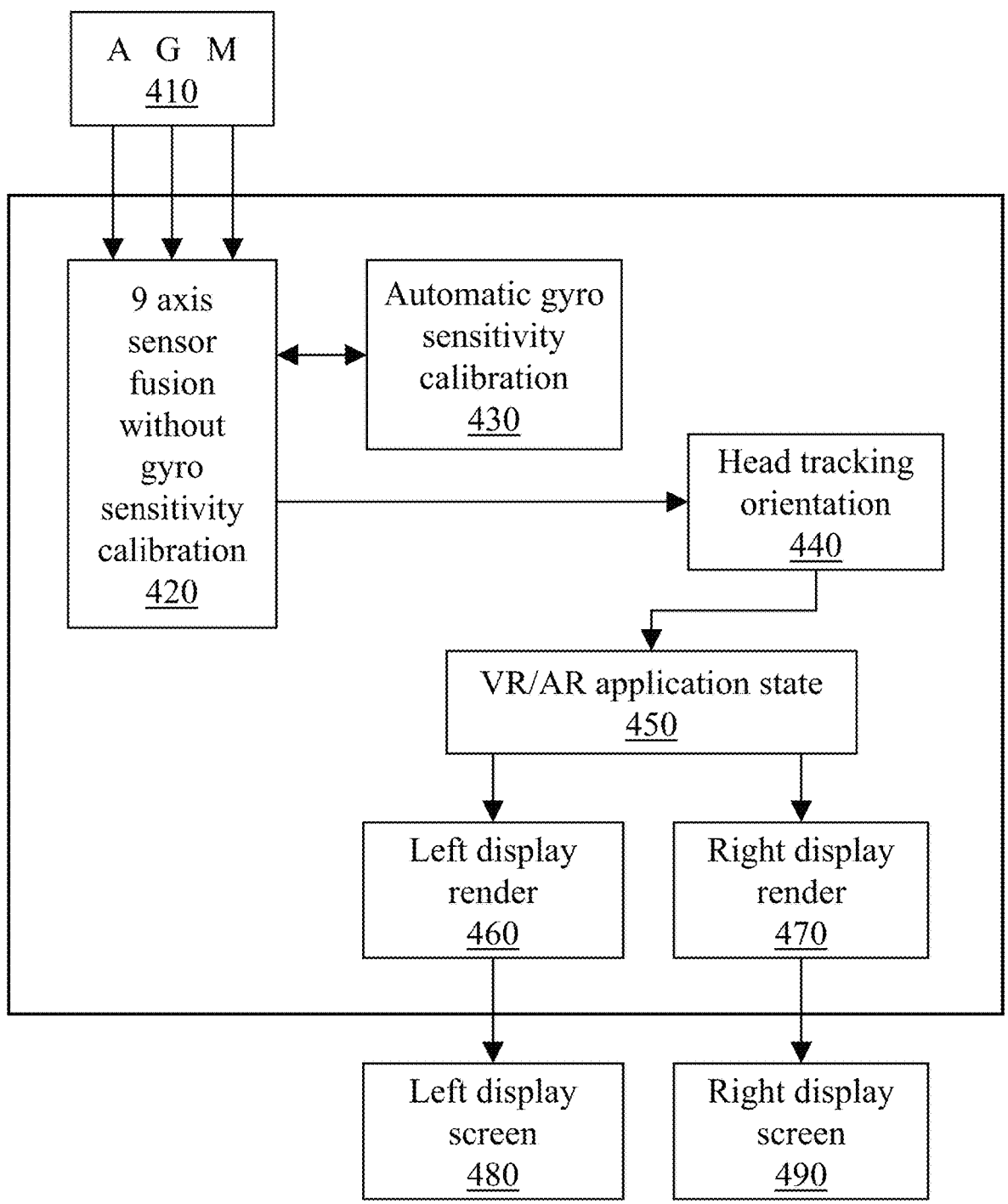
FIG. 4 illustrates an example block diagram of virtual reality goggles for head tracking that includes implementations of the disclosed technology.

Typically, path dependent rotations may result in an unexplained net yaw (z-rotation in world coordinates), and the user of the VR goggles will spin in a slow circle adjusting their physical orientation in order to the keep the image stable in their viewscreens. FIG. 4 shows a simplified block diagram of a VR system that incorporates an automatic gyro sensitivity calibration module that provides a better VR/AR experience for the user.

Figure 5A:
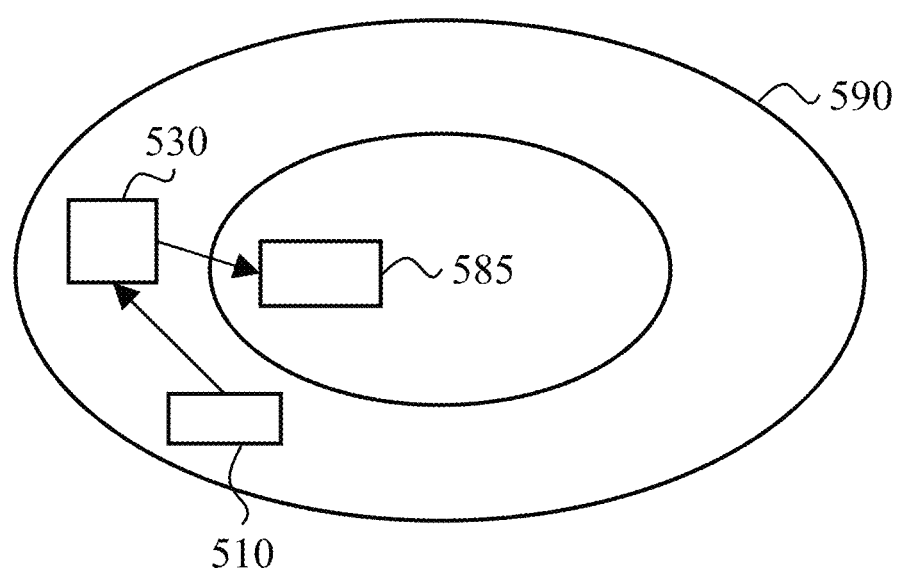
FIG. 5A illustrates an example diagram of a smart contact lens for eye tracking that includes implementations of the disclosed technology.
Figure 5B:
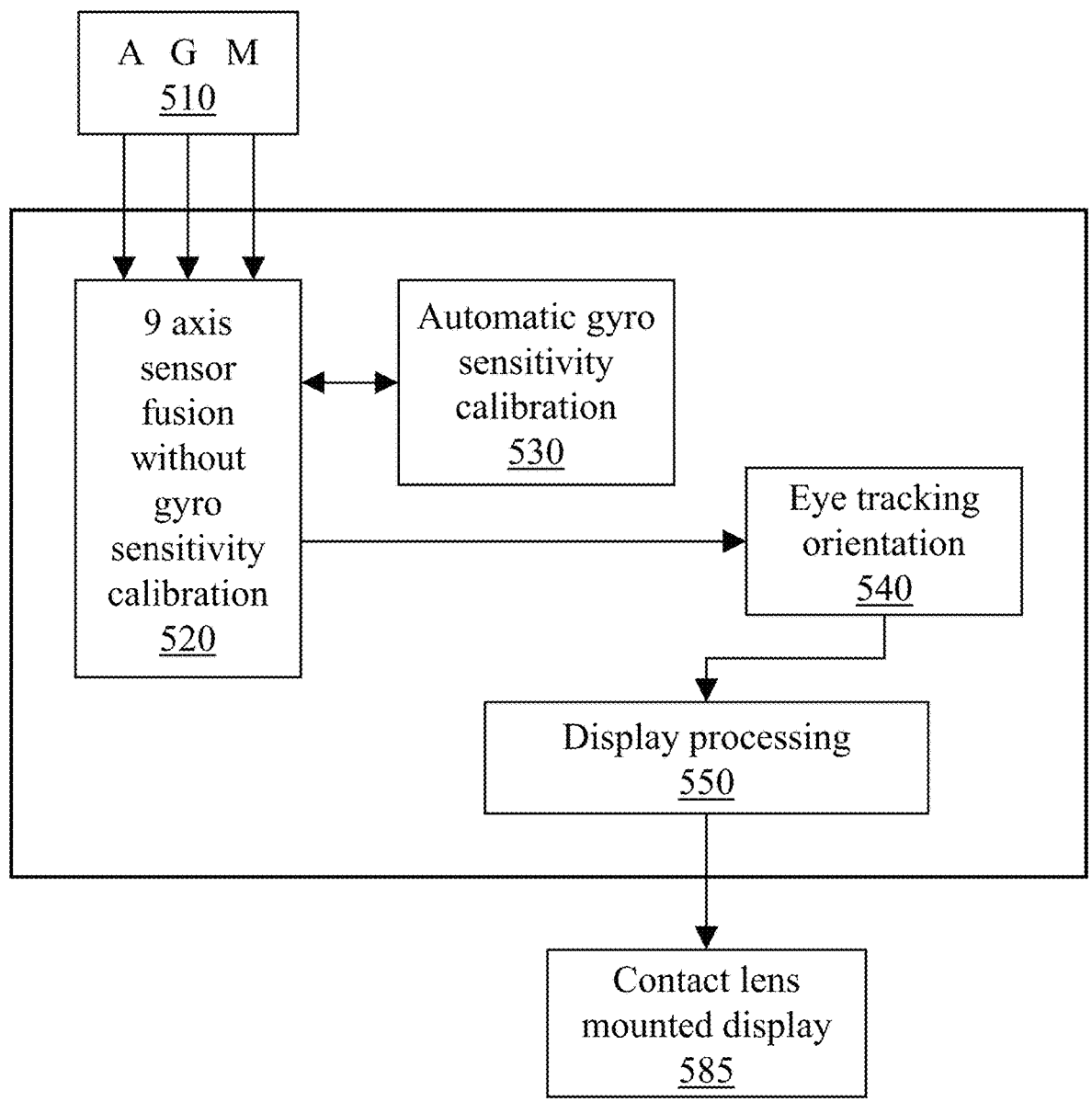
FIG. 5B illustrates another example diagram of a smart contact lens for eye tracking that includes implementations of the disclosed technology.

Smart Contact Lenses for Eye Tracking:

In an example application, implementations of the disclosed technology may be used in smart contact lenses for eye tracking. FIGS. 5A and 5B show simplified block diagrams of a smart contact lens framework that incorporates an automatic gyro sensitivity calibration module that provides a better eye tracking experience for the user. As shown in FIG. 5A, the display 585 and associated sensor package 510 may be mounted on a contact lens 590 so that the display motion matches the motion of the eye.

Eye motion adds significant challenges as compared to head motion tracking since angular velocity and angular acceleration of the eye are both much higher than those experienced during head tracking. The eye regular makes rapid jumps (known as "saccades") with angular acceleration rates often exceeding 20,000 degrees/sec$^2$. During these jumps, eye tracking will rely almost entirely on the gyroscope outputs. If there is significant uncalibrated sensitivity error in the gyroscope, this will result in an error in the magnitude of the saccade, which tends to cause nausea specifically and a frustrating user experience in general. Always updating the gyro sensitivity estimate solves this calibration issue and results in correct saccade magnitude calculation.

Figure 6A:
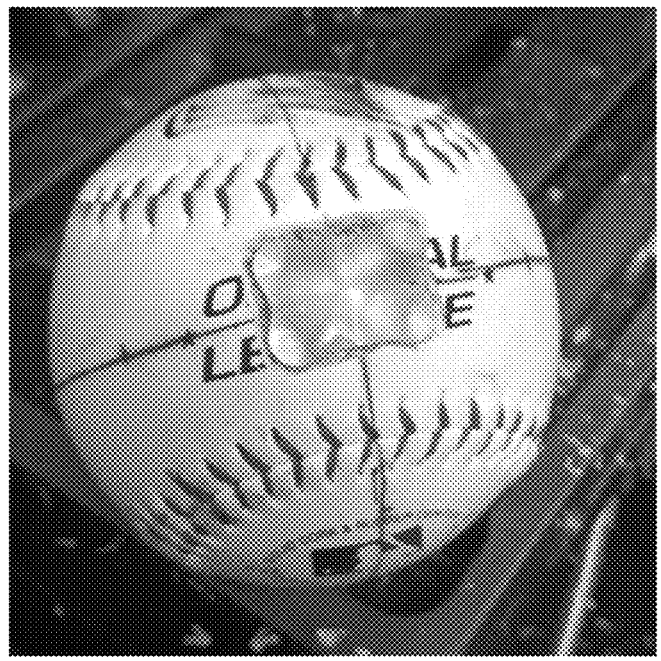
FIG. 6A illustrates an example photo for a baseball trainer that includes implementations of the disclosed technology.
Figure 6B:
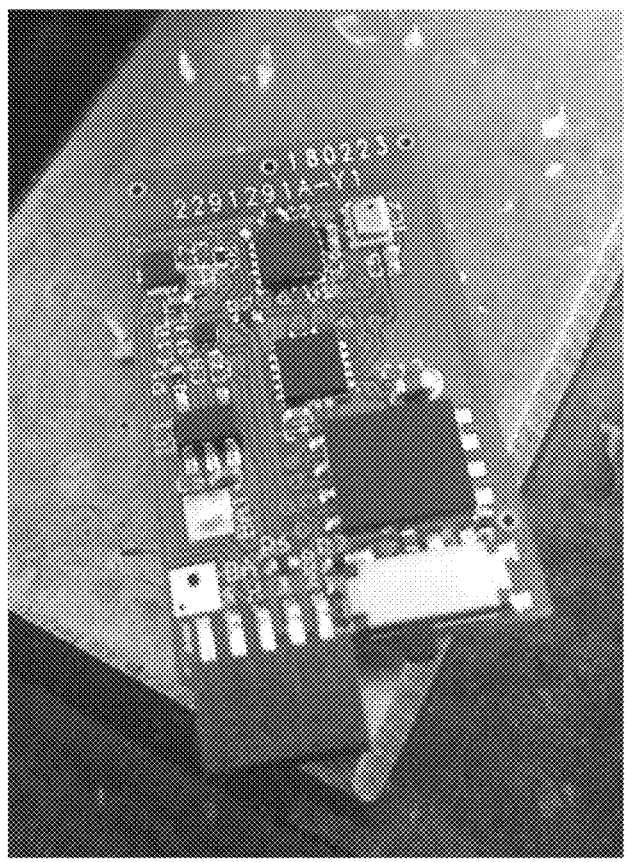
FIG. 6B illustrates another example photo for a baseball trainer that includes implementations of the disclosed technology.
Figure 6C:
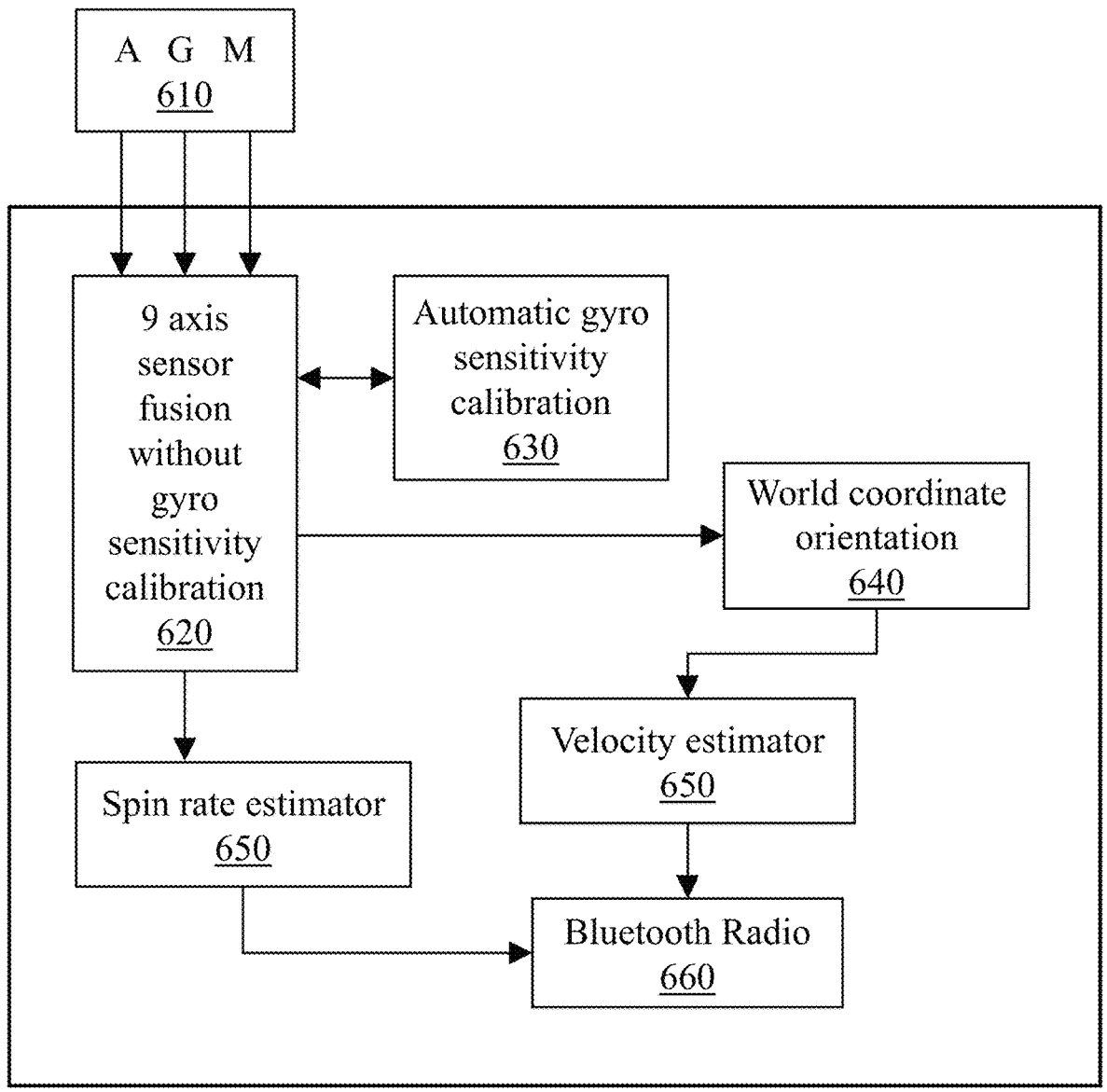
FIG. 6C illustrates an example diagram for a baseball trainer that includes implementations of the disclosed technology.

Baseball Training:

In an example application, implementations of the disclosed technology may be used to calculate baseball velocity. In order to accurately calculate baseball velocity at pitcher release, the observed acceleration vector must be integrated using the correct orientation. The required level of accuracy means the gyro sensitivity must be calibrated. FIGS. 6A and 6B example photos for a baseball trainer that include implementations of the disclosed technology. FIG. 6C shows a simplified block diagram for an example baseball trainer that include implementations of the disclosed technology.

In some embodiments, the sensors experience considerable shock when the ball is caught, or otherwise hits a fixed object. Since MEMS rate gyroscopes can experience parameter changes as a result of shock, it is advantageous to perform automatic updates to both the bias and sensitivity. Otherwise, device velocity calculation accuracy will tend to worsen with use.

Indoor Navigation:

In an example application, implementations of the disclosed technology may be used to provide navigation in indoor environments that may have serious magnetic anomalies (e.g., hard and soft iron) that can cause systems to lose calibration or cause improper calibration, or at the very least render the magnetometer data unreliable for significant time. In some embodiments, indoor navigation can be enabled using cluster calibration. In other embodiments, the automatic calibration of the gyro sensitivity will allow better heading accuracy during magnetic anomalies when the gyro/accelerometer is relied upon to maintain correct heading. In this scenario, sensitivity errors manifest as heading errors if the path is not straight.

Outdoor Navigation:

For systems with no magnetometer to provide yaw reference, path dependent rotations that return to the same orientation (individual axis sums do not total zero even though the total rotation does) can result in heading drift. Embodiments of the disclosed technology can compensate for this effect by recognizing that repeated motions and calculating drift rate based on the particular path-dependent periodic motion. That is, this method may use the accelerometer and gyroscope, but no magnetometer input, to further calibrate gyro sensitivity, albeit requiring GPS support.

In some embodiments, implementations of the disclosed technology may be used for outdoor navigation during interruptions in global navigation satellite system (GNSS) availability and/or poor GNSS signal quality. For example, GPS signals are typically as weak as −125 dBm to −130 dBm, even in clear open sky, after having traversed the 22,000 km from the satellite to the Earth's surface. In urban environments or under foliage, signal strength can drop as low as −150 dBm. Thus, a good high sensitivity GPS receiver can acquire signals down to −155 dBm and tracking can be continued down to levels approaching −165 dBm.

UAV Drone Avionics Package:

In an example application, implementations of the disclosed technology may be used to provide support to UAVs and drones, while in flight or on the ground, due to magnetic anomalies that may be encountered from metals/radiators in the environment or active adversaries. In some embodiments, the same methodologies adopted in the outdoor navigation scenario (since there is no magnetometer input in that case) may be used here to support UAVs and drones.

Physical Therapy and Motion Tracking Garments:

In some embodiments, a physical therapy device may be made with multiple sensor clusters that can be coupled to the body. The relative changes in rotation and/or translation between the sensor clusters may be measured as the user goes through either a sports exercise or physical therapy regimen using embodiments of the disclosed technology. For example, gyro sensitivity calibration may be necessary for each cluster in order to accurately measure relative rotation.

Using the automatic calibration of gyro sensitivity, as described in embodiment of the presently disclosed technology, advantageously avoids the expensive and time consuming step of factory gyro sensitivity calibration. Furthermore, the automatic calibration will adapt for more accurate measurements as temperature, mechanical stress changes, and aging of the sensor effects change the optimal calibration values.

Exemplary Methods and Implementations for the Disclosed Technology

Figure 7:
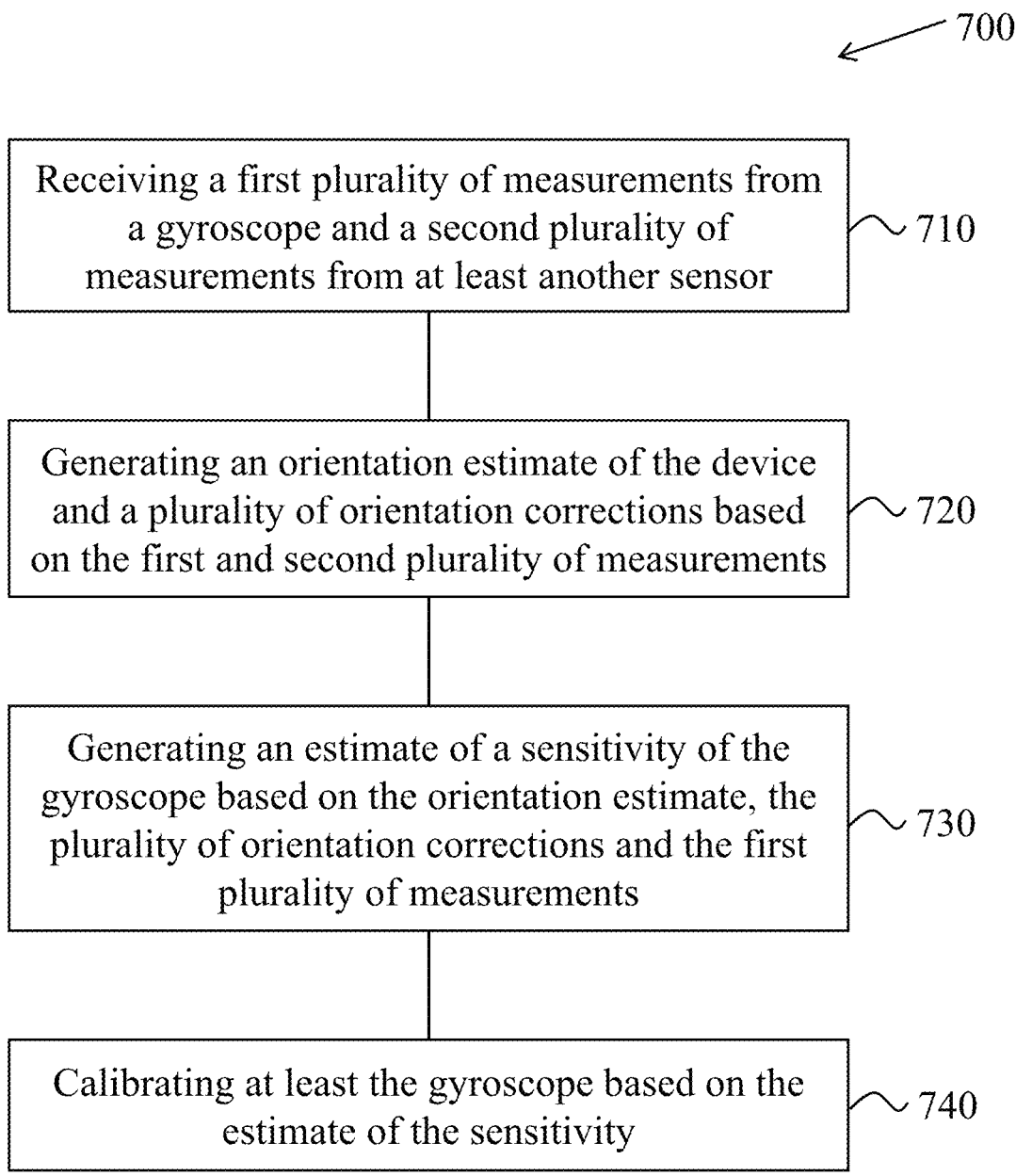
FIG. 7 shows a flowchart of an example method for automatic calibration of rate gyroscope sensitivity, in accordance with the disclosed technology.

FIG. 7 shows a flowchart of an exemplary method for automatic calibration of rate gyroscope sensitivity. The method 700 includes, at operation 710, receiving a first plurality of measurements from a gyroscope and a second plurality of measurements from at least another sensor including at least one accelerometer. In some embodiments, the at least another sensor is an accelerometer. In other embodiments, the at least another sensor further includes a magnetometer.

The method 700 includes, at operation 720, generating an orientation estimate of the device and a plurality of orientation corrections based on the first and second plurality of measurements.

The method 700 includes, at operation 730, generating an estimate of a sensitivity of the gyroscope based on the orientation estimate, the plurality of orientation corrections and the first plurality of measurements.

In some embodiments, generating the estimate of the sensitivity of the gyroscope includes determining a measurement duration, from a start time and an end time, for a sensitivity measurement, constructing the sensitivity measurement by summing the first plurality of measurements over the measurement duration, constructing a sensitivity measurement error by summing the plurality of orientation corrections over the measurement duration, and updating the estimate of the sensitivity based on the sensitivity measurement and the sensitivity measurement error. In an example, the start time of the measurement duration is based on a comparison between an angular rotation rate for an axis of the gyroscope and a threshold. For example, the start time can be triggered when the angular rotation rate exceeds the threshold. For another example, the start time is the time corresponding to the angular rotation rate being greater than or equal to the threshold.

The method 700 includes, at operation 740, calibrating at least the gyroscope based on the estimate of the sensitivity.

In some embodiments, the device is operable for indoor navigation, and the method 700 further comprises the operation of determining that the second plurality of measurements from the magnetometer is unreliable, wherein calibrating at least the gyroscope based on the estimate of the sensitivity compensates, at least in part, for the unreliable second plurality of measurements. In an example, the indoor navigation is not in a straight line, and the sensitivity measurement error manifests as a heading error.

In some embodiments, the orientation estimate is expressed as (a) a quaternion, (b) a set of Euler angles, or (c) an orientation axis and a corresponding amount of rotation about the orientation axis.

In some embodiments, the device comprises a pair of virtual-reality (VR) goggles, calibrating at least the gyroscope based on the estimate of the sensitivity compensates, at least in part, for a path dependent rotation in the pair of VR goggles, and the path dependent rotation is manifested upon the pair of VR goggles experiencing a net rotation despite returning to an original location or orientation. In an example, the path dependent rotation comprises a net oscillation about a vertical axis of the VR goggles. In another example, calibrating at least the gyroscope stabilizes an image in the pair of VR goggles.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed are techniques and structures as described and shown, including:

1. A method for automatic calibration in a device, comprising:
   receiving a first plurality of measurements from a gyroscope and a second plurality of measurements from at least another sensor including at least one accelerometer;
   generating an orientation estimate of the device and a plurality of orientation corrections based on the first and second plurality of measurements;

generating an estimate of a sensitivity of the gyroscope based on the orientation estimate, the plurality of orientation corrections and the first plurality of measurements;

determining a measurement duration, from a start time and an end time, for a sensitivity measurement;

constructing the sensitivity measurement by summing the first plurality of measurements over the measurement duration;

constructing a sensitivity measurement error by summing the plurality of orientation corrections over the measurement duration;

updating the estimate of the sensitivity based on the sensitivity measurement and the sensitivity measurement error; and calibrating at least the gyroscope based on the estimate of the sensitivity.

2. The method of claim 1, wherein updating the estimate of the sensitivity comprises:

determining a measurement weight; and scaling the sensitivity measurement by the measurement weight.

3. The method of claim 1, wherein the start time of the measurement duration is based on a comparison between an angular rotation rate for an axis of the gyroscope and a threshold.

4. The method of claim 1, wherein the at least another sensor further comprises a magnetometer.

5. The method of claim 4, wherein the device is operable for indoor navigation, and wherein the method further comprises:

determining that the second plurality of measurements from the magnetometer is unreliable, wherein calibrating at least the gyroscope based on the estimate of the sensitivity compensates, at least in part, for the unreliable second plurality of measurements.

6. The method of claim 5, wherein the indoor navigation is not in a straight line, and wherein the sensitivity measurement error manifests as a heading error.

7. The method of claim 1, wherein the orientation estimate is expressed as (a) a quaternion, (b) a set of Euler angles, (c) an orientation axis and a corresponding amount of rotation about the orientation axis, or (d) a rotation matrix.

8. The method of claim 1, wherein the at least another sensor is an accelerometer.

9. A method for automatic calibration in a device, comprising:

receiving a first plurality of measurements from a gyroscope and a second plurality of measurements from at least another sensor including at least one accelerometer;

generating an orientation estimate of the device and a plurality of orientation corrections based on the first and second plurality of measurements;

generating an estimate of a sensitivity of the gyroscope based on the orientation estimate, the plurality of orientation corrections and the first plurality of measurements; and calibrating at least the gyroscope based on the estimate of the sensitivity, wherein the device comprises a pair of virtual-reality (VR) goggles, wherein calibrating at least the gyroscope based on the estimate of the sensitivity compensates, at least in part, for a path dependent rotation in the pair of VR goggles, and wherein the path dependent rotation is manifested upon the pair of VR goggles experiencing a net rotation despite returning to an original location or orientation.

10. The method of claim 9, wherein the path dependent rotation comprises a net oscillation about a vertical axis of the VR goggles.

11. The method of claim 9, wherein calibrating at least the gyroscope stabilizes an image in the pair of VR goggles.

12. An apparatus for automatic calibration in a device, comprising: a processor and a memory including instructions stored thereupon, wherein the instructions upon execution by the processor cause the processor to:

receive a first plurality of measurements from a gyroscope and a second plurality of measurements from at least another sensor including at least one accelerometer;

generate an orientation estimate of the device and a plurality of orientation corrections based on the first and second plurality of measurements;

generate an estimate of a sensitivity of the gyroscope based on the orientation estimate, the plurality of orientation corrections and the first plurality of measurements;

determine a measurement duration, from a start time and an end time, for a sensitivity measurement;

construct the sensitivity measurement by summing the first plurality of measurements over the measurement duration;

construct a sensitivity measurement error by summing the plurality of orientation corrections over the measurement duration;

update the estimate of the sensitivity based on the sensitivity measurement and the sensitivity measurement error; and calibrate at least the gyroscope based on the estimate of the sensitivity.

13. The apparatus of claim 12, wherein the instructions upon execution by the processor further cause the processor to:

determining a measurement weight; and scaling the sensitivity measurement by the measurement weight.

14. The apparatus of claim 12, wherein the start time of the measurement duration is based on a comparison between an angular rotation rate for an axis of the gyroscope and a threshold.

15. The apparatus of claim 12, wherein the at least another sensor is an accelerometer.

16. The apparatus of claim 12, wherein the at least another sensor further comprises a magnetometer.

17. An apparatus for head tracking that uses a pair of virtual-reality (VR) goggles, the pair of VR goggles comprising a gyroscope and at least another sensor including at least one accelerometer, the apparatus comprising:

a processor and a memory including instructions stored thereupon, wherein the instructions upon execution by the processor cause the processor to:

determine a path dependent rotation in the pair of VR goggles, wherein the path dependent rotation is manifested upon the pair of VR goggles experiencing a net rotation despite returning to an original location or orientation, wherein calibrating at least the gyroscope compensates, at least in part, for the path dependent rotation, and wherein the calibrating comprises:

receiving a first plurality of measurements from the gyroscope and a second plurality of measurements from the at least another sensor;

generating an orientation estimate of the pair of VR goggles and a plurality of orientation corrections based on the first and second plurality of measurements;

generating an estimate of a sensitivity of the gyroscope based on the orientation estimate, the plurality of orientation corrections and the first plurality of measurements; and calibrating at least the gyroscope based on the estimate of the sensitivity, which stabilizes an image in the pair of VR goggles.

* * * * *